United States Patent
Kada et al.

(10) Patent No.: US 6,911,072 B2
(45) Date of Patent: Jun. 28, 2005

(54) AQUEOUS COATING LIQUID FOR FORMING A MAGNESIUM OXIDE FILM

(75) Inventors: Koji Kada, Ibaraki (JP); Kouhei Sawada, Nishinomiya (JP)

(73) Assignee: NOF Corporation, Tokyo (JP)

( * ) Notice: Subject to any disclaimer, the term of this patent is extended or adjusted under 35 U.S.C. 154(b) by 0 days.

(21) Appl. No.: 10/803,173

(22) Filed: Mar. 17, 2004

(65) Prior Publication Data

US 2004/0247505 A1 Dec. 9, 2004

(30) Foreign Application Priority Data

Mar. 18, 2003 (JP) ........................................ 2003-073890

(51) Int. Cl.[7] ............................................. C09D 191/00
(52) U.S. Cl. .................... 106/287.24; 106/243
(58) Field of Search ............................. 106/243, 287.24

(56) References Cited

U.S. PATENT DOCUMENTS 6,149,967 A    11/2000   Mitamura et al.

FOREIGN PATENT DOCUMENTS

| EP | 1 415 976 A1 | 5/2004 |
|---|---|---|
| FR | 2 805 184 A1 | 2/2000 |
| JP | 9-95627 A | 4/1997 |
| JP | 9-129141 A | 5/1997 |
| JP | 2001-10816 A | 1/2001 |
| WO | WO 95/23119 A1 | 8/1995 |

*Primary Examiner*—David Brunsman
(74) *Attorney, Agent, or Firm*—The Webb Law Firm, P.C.

(57) ABSTRACT

An aqueous coating liquid for forming a magnesium oxide film comprising (a) a magnesium carboxylate derived from a carboxylic acid having 1 to 6 carbon atoms, (b) a surfactant, (c) a polyhydric alcohol compound, and (d) a solvent made substantially of water, wherein the magnesium carboxylate is contained in a ratio of 5 wt % or more and 50 wt % or less. The surfactant is contained in a ratio of 0.01 wt % or more and 2.5 wt % or less, and the polyhydric alcohol compound is contained in a ratio of 0.05 wt % or more and 40 wt % or less, based on a weight of the entire coating liquid. The magnesium carboxylate content is the same with or larger than that of the polyhydric alcohol compound, and a total weight of the magnesium carboxylate and the polyhydric alcohol compound is 80 wt % or less of the weight of the entire coating liquid; and wherein the magnesium carboxylate, the surfactant, and the polyhydric alcohol compound are dissolved in the solvent.

3 Claims, No Drawings

AQUEOUS COATING LIQUID FOR FORMING A MAGNESIUM OXIDE FILM

BACKGROUND OF THE INVENTION

1. Field of the Invention

The present invention relates to an aqueous coating liquid suitable for forming a magnesium oxide film used as a dielectric protective film in a plasma display panel (PDP) or the like by the coating pyrolysis method.

2. Description of the Related Art

Magnesium oxide films are used in a wide range of applications such as protective films for PDPs, insulating films, catalyst films, or surface protective films. Conventionally, films of metal oxide such as films of magnesium oxide have been formed by a physical film-forming method such as sputtering and vacuum evaporation. When these methods are employed, a uniform, dense and highly crystalline film can be obtained. On the other hand, since the films are formed under a vacuum, a large, complicated and expensive apparatus is necessary. Furthermore, since the films are produced by batch production, the production efficiency is low and the production cost is high.

In contrast to physical methods, the coating pyrolysis method may be employed by which a metal oxide film can be formed in a simple process without an expensive and complex apparatus. This coating pyrolysis method includes a process of applying a coating liquid containing a desired metal compound on a substrate uniformly, a process of removing a solvent in the resultant film completely by pre-baking, and a process of performing baking at a high temperature. In order to obtain a uniform and transparent metal oxide film as a final product, it is necessary to obtain a good coating properties and to maintain the uniformity and the transparency of the formed film in each process.

Japanese Laid-Open Patent Publication Nos. 9-95627 and 9-129141 disclose a method for forming a magnesium oxide film using a coating liquid in which a magnesium carboxylate is dissolved in a solvent. All of the solvents used in these methods are organic solvents such as xylene or butyl carbitol. When a film is formed with a coating liquid using such an organic solvent, uniform coating can be easily performed on a substrate, but at pre-baking after the substrate is coated, the organic solvent is released in the air, which may harm the environment.

On the other hand, when a film is formed by coating using a solution in which a metal compound such as a water soluble magnesium carboxylate is contained in a water-based solvent, no organic solvent is released, so that the adverse effect to the environment can be reduced. However, when a substrate is coated with a coating liquid containing a water-based solvent, the coating liquid is repelled on the substrate by the surface tension of the water, so that no uniform film can be obtained. The water soluble magnesium carboxylate is generally derived from a short chain carboxylic acid, and therefore the crystallinity of the magnesium carboxylate itself is high. For this reason, when the substrate is coated with such a coating liquid and pre-baked, the magnesium carboxylate crystallizes and is precipitated, and thus it is difficult to obtain a transparent and uniform film on the substrate.

As a method for coating a substrate with an aqueous coating liquid, Japanese Laid-Open Patent Publication No. 2001-10816 discloses a coating liquid that comprises an aqueous solution containing a metal complex in which a metal such as copper, titanium, nickel, or magnesium is coordinated to a ligand such as EDTA, or a salt thereof, and a water-soluble polymer such as polyethylene glycol, polyvinyl alcohol, and collagen as a film-forming substance. However, although the substrate can be coated uniformly with such a coating liquid containing the above-mentioned polymer, opaqueness occurs when pre-baking is performed, and thus it is difficult to form a film having excellent uniformity and transparency.

SUMMARY OF THE INVENTION

The aqueous coating liquid for forming a magnesium oxide film of the present invention comprises: (a) a magnesium carboxylate derived from a carboxylic acid having 1 to 6 carbon atoms, (b) a surfactant, (c) a polyhydric alcohol compound, and (d) a solvent made substantially of water; wherein the magnesium carboxylate is contained in a ratio of 5 wt % or more and 50 wt % or less, the surfactant is contained in a ratio of 0.01 wt % or more and 2.5 wt % or less, and the polyhydric alcohol compound is contained in a ratio of 0.05 wt % or more and 40 wt % or less, based on a weight of the entire coating liquid; wherein a content of the magnesium carboxylate is the same with or larger than that of the polyhydric alcohol compound, and a total weight of the magnesium carboxylate and the polyhydric alcohol compound is 80 wt % or less of the weight of the entire coating liquid; and wherein the magnesium carboxylate, the surfactant, and the polyhydric alcohol compound are dissolved in the solvent.

In a preferred embodiment, the polyhydric alcohol compound has a molecular weight of 1000 or less.

In a preferred embodiment, the surfactant is free from a metal element and a halogen element.

Thus, the invention described herein makes possible the advantages of providing an aqueous coating liquid for forming a magnesium oxide film that contains a short chain magnesium carboxylate in a high concentration, that can be applied uniformly onto a substrate, that can maintain uniformity and transparency without causing the magnesium carboxylate to be precipitated after pre-baking, and that can form a transparent and uniform magnesium oxide film having a thickness sufficient for practical use; and providing a coating liquid for forming a magnesium oxide film that has the above-described properties and can be suitably used for preparing a dielectric protective film in a plasma display panel (PDP), an insulating film, a catalyst film, a surface protective film, or the like.

DESCRIPTION OF THE PREFERRED EMBODIMENT

The aqueous coating liquid for forming a magnesium oxide film of the present invention includes at least a magnesium salt of a carboxylic acid having 1 to 6 carbon atoms (hereinafter, referred to as "magnesium carboxylate" (a) or "component (a)"), a surfactant (hereinafter, referred to as "surfactant (b)" or "component (b)"), a polyhydric alcohol compound (hereinafter, referred to as "polyhydric alcohol compound (c)" or "component (c)") and a solvent made substantially of water (hereinafter, referred to as "solvent (d)" or "component (d)").

(1) Magnesium Carboxylate (a)

The carboxylic acid constituting the magnesium carboxylate (a) contained in the aqueous coating liquid of the present invention for forming a magnesium oxide film has 1 to 6 carbon atoms. As the magnesium carboxylate (a), it is preferable to select a compound that can be dissolved in water and kept stable when being dissolved. The carboxylic acid preferably has 1 to 4 carbon atoms. When the number of carbon atoms is more than 6, the solubility of the magnesium carboxylate in water is very poor. Therefore, the concentration of the metal (i.e., magnesium) contained in the coating liquid is low so that the thickness of a film formed by the use of the coating liquid is extremely small and thus, the film cannot be employed for practical use.

The carboxylic acid constituting the magnesium carboxylate (a) employed in the present invention contains at least one carboxyl group in its molecule. This carboxylic acid may have a polar substituent that improves the solubility in a solvent, such as a hydroxyl group, an amino group or a nitro group. Examples of the carboxylic acid include fomic acid, acetic acid, propionic acid, butyric acid, isobutyric acid, valeric acid, isovaleric acid, caproic acid, 2-ethyl butyric acid, glycolic acid, lactic acid, aspartic acid, acrylic acid, methacrylic acid, crotonic acid, pyruvic acid, maleic acid, and itaconic acid. The magnesium carboxylate (a) may be a compound having moieties derived from one kind of carboxylic acid in one molecule or a compound having moieties derived from different kinds of carboxylic acids. Furthermore, a mixture of at least two kinds of the magnesium carboxylates (a) can be employed.

As described later, in order to form a transparent film having a sufficient thickness, it is preferable to select a compound having a solubility of 5 wt % or more in water as the magnesium carboxylate (a). In this specification, "solubility in water" means the solubility in water at a temperature of 20° C. When a transparent and uniform coating liquid is prepared using a magnesium carboxylate having a solubility of less than 5 wt % in water, the metal content in the coating liquid becomes low. Therefore, when this coating liquid is used for coating and film-formation, only a film having a small thickness can be obtained. If such a magnesium carboxylate is added in a concentration exceeding the solubility, the obtained coating liquid is opaque, and if this coating liquid is used for coating and film-formation, a transparent and uniform film cannot be obtained.

(2) Surfactant (b)

In the aqueous coating liquid for forming a magnesium oxide film of the present invention, the surfactant (b) is contained for the purpose of reducing the surface tension of an aqueous coating liquid so that the aqueous coating liquid can be applied uniformly without being repelled on a substrate.

It is preferable that this surfactant is free from metal elements and halogen elements. When a surfactant containing a metal component is used as the surfactant, a magnesium oxide film formed by coating a substrate with the coating liquid, and drying and baking the same contains a metal component derived from the surfactant. The magnesium oxide film containing such a metal component may not exhibit the electrical characteristics inherent in magnesium oxide. Moreover, when a surfactant containing a halogen element is used, a halogen gas is produced in the process of baking, which may pollute the baking furnace. In addition, if the surfactant is not degraded and the halogen element is present in a magnesium oxide film, the film may be colored or the electrical characteristics of the film may be affected adversely.

As described later, in order to form a transparent film having a sufficient thickness, it is preferable to select a compound having a solubility of at least 0.01 wt % in water as the surfactant (b). When a transparent and uniform coating liquid containing a surfactant having a solubility of less than 0.01 wt % in a low concentration is prepared, the amount of the surfactant dissolved in the coating liquid cannot improve the wettability on the substrate. Therefore, when the coating liquid is applied on a substrate, the coating liquid is repelled so that the substrate cannot be coated uniformly. If such a surfactant having a solubility of less than 0.01 wt % in water is added to water in a ratio of 0.01 wt % or more, a portion in which the surfactant is not dissolved is present, so that the resultant coating liquid becomes opaque. As a result, when this coating liquid is used for film-formation, a transparent and uniform film cannot be obtained.

As the surfactant (b) contained in an aqueous coating liquid for forming a magnesium oxide film of the present invention, any nonionic surfactant, anionic surfactant, cationic surfactant or ampholytic surfactant can be selected.

Among these, it is preferable to use a nonionic surfactant. This is because nonionic surfactants are hardly affected by magnesium ion and carboxylic acid ion, which are constituent components of the magnesium carboxylate (a), have excellent surface activation performance, and can contribute to the temporal stability of the coating liquid. When an ionic surfactant is used, a salt exchange reaction with the component (i.e., magnesium ion or carboxylic acid ion) of the magnesium carboxylate may occur so that the coating liquid may be deteriorated or the surface activation performance of the coating liquid lowers.

Examples of the nonionic surfactant that may be used as the surfactant in the present invention include polyoxyalkylene alkyl ether, polyoxyalkylene alkyl phenyl ether, polyoxyalkylene fatty acid ester, polyoxyalkylene sorbitan mono-fatty acid ester, and polyoxyalkylene alkylamine.

Examples of the anionic surfactant include polyoxyalkylene alkyl ether sulfate, acylmethyl taurine salt, alkylbenzenesulfonate, and alkyl sulfosuccinate.

Examples of the cationic surfactant include alkylamine acetate, alkyl trimethylammonium acetate, and alkyl dimethylbenzyl ammonium acetate.

Examples of the ampholytic surfactant include dimethyl alkylbetaine, amidobetaine surfactants, and imidazoline surfactants.

These surfactants can be used alone or in combination of two or more.

(3) Polyhydric Alcohol Compound (c)

In the aqueous coating liquid for forming a magnesium oxide film of the present invention, the polyhydric alcohol compound (c) is contained to prevent the coating film on the substrate from being opaque when the solvent is evaporated in the process of pre-baking after the coating liquid is applied onto the substrate.

Without being bound to the following theory, it can be theorized that one cause of the opaqueness of the coating film on the substrate is crystallization due to the association of the molecules of the magnesium carboxylate (a). When a suitable amount of the polyhydric alcohol compound (c) is present in the coating liquid, a hydroxyl group of a polyhydric alcohol molecule is considered to be partially coordinated to a metal moiety of the magnesium carboxylate and enters between the magnesium carboxylate molecules, which inhibits the association and the crystallization of the magnesium carboxylate molecules at pre-baking after a film is formed. Consequently, a transparent film can be formed.

The polyhydric alcohol compound (c) used in the present invention preferably has a molecular weight of 1000 or less, more preferably 800 or less. It is believed that when a polyhydric alcohol compound having a molecular weight of more than 1000 is contained in the coating liquid, the density of hydroxyl groups in the molecule is low, so that the polyhydric alcohol compound cannot be coordinated efficiently to the magnesium carboxylate. Therefore, it is difficult to inhibit crystallization sufficiently, so that opaqueness due to aggregation of the magnesium carboxylate easily occurs on the substrate when pre-baking is performed. Furthermore, a high molecular weight polyhydric alcohol compound having a molecular weight of more than 1000 cannot decompose easily, so that in the process of baking, carbon residues may remain in the oxide magnesium film, and high temperature is required for complete decomposition.

It is preferable that the weight reduction end temperature in the thermal gravimetry (TG) of the polyhydric alcohol compound is in the range from 200° C. to 500° C. Herein, the weight reduction end temperature refers to a temperature at the point when a weight reduction is no longer observed in the TG curve. When a polyhydric alcohol compound having a weight reduction end temperature of less than 200° C. is used, the polyhydric alcohol compound may be evaporated before the magnesium carboxylate (a) decomposes in the process of pre-baking and baking, and the magnesium carboxylate may be crystallized on the substrate. Furthermore, when a polyhydric alcohol compound having a weight reduction end temperature of more than 500° C. is used, the polyhydric alcohol compound would not completely decompose in the process of baking, so that decomposition residues would be contained in the film.

As the polyhydric alcohol compound (c) contained in the coating liquid of the present invention, any compound that has at least two hydroxyl groups in its molecule and thus, is readily soluble in water can be employed. For example, low molecular weight polyhydric alcohols such as diethylene glycol, neopentyl glycol, glycerin, trimethylolpropane, pentaerythritol, diglycerin, sorbitol, mannitol, sorbitan, and triglycerin can be used. Among these compounds, the following compounds are more preferable: polyhydric alcohol compounds that are liquid at room temperature such as diethylene glycol, glycerin, diglycerin, sorbitol, sorbitan, and triglycerin. These compounds can be used alone but when a mixture of at least two compounds having different weight reduction end temperatures is used, volume contraction in the process of baking can be more moderate and cracks are prevented from occurring.

(4) Solvent (d)

The solvent (d) contained in the coating liquid of the present invention is made substantially of water. Herein, "a solvent made substantially of water" refers to water or a water-based solvent having properties that is the same with or similar to those of water as a whole. The content of water in the solvent (d) is preferably 70 wt % or more. As the solvent (d), water and an aqueous solvent containing a water-soluble alcohol solvent in a range that does not inhibit the effect of the present invention can be used. As the solvent (d), an aqueous solvent containing a water-soluble alcohol solvent in a ratio of less than 30 wt %, more preferably less than 20 wt %, most preferably less than 10 wt %, or water is preferable. When a solvent other than water is contained in a ratio of more than 30 wt %, the effect of improving the wettability of the surfactant cannot be sufficiently obtained. Therefore, the coating liquid is repelled on the substrate in the process of coating or the coating liquid cannot be applied on the substrate uniformly. Examples of the water-soluble alcohol include methanol, ethanol, 1-propanol, and 2-propanol.

(5) Aqueous Coating Liquid

The aqueous coating liquid of the present invention contains the magnesium carboxylate (a), the surfactant (b), the polyhydric alcohol compound (c), and the solvent (d) as described above, and these components are present in a dissolved state in the coating liquid.

The magnesium carboxylate (a) is contained in the coating liquid in the range from 5 wt % to 50 wt %. When the content of the component (a) is less than 5 wt %, the metal (magnesium) content in the coating liquid is low, and when this coating liquid is used for coating and film-formation, the formed film is thin. The thickness of such a film is not sufficient for practical use. When the content of the component (a) is more than 50 wt %, the magnesium carboxylate is not completely dissolved in the coating liquid, and the coating liquid becomes opaque. When this coating liquid is used for coating and film-formation, a transparent film cannot be obtained.

The surfactant (b) is contained in the range from 0.01 wt % to 2.5 wt % in the coating liquid. When the content of the component (b) is less than 0.01 wt %, the surface tension of the coating liquid cannot be sufficiently reduced, so that the coating liquid is repelled on the substrate and thus a uniform coating film cannot be obtained. When the content of the component (b) is more than 2.5 wt %, the coating performance on the substrate can be improved, but surplus surfactant aggregates on the substrate and becomes opaque when pre-baking is performed after coating. When baking is performed in this state, the opaqueness remains and thus a transparent and uniform film cannot be obtained.

The polyhydric alcohol compound (c) is contained in the range from 0.05 wt % to 40 wt % in the coating liquid. When the content of the component (c) is less than 0.05 wt %, opaqueness of the coating film on the substrate tends to occur when the solvent is evaporated in the process of pre-baking after coating. Also when the content of the component (c) is more than 40 wt %, opaqueness tends to occur. This may be because association of the component (c) occurs in the process of pre-baking. Thus, when the content is outside the above range, in either case, a transparent and uniform film cannot be obtained by baking.

The component (a) is contained in an amount that is the same with or larger than that of the component (c). When the content of the component (a) is smaller than the content of the component (c), opaqueness occurs on the substrate. When baking is performed in such a state, a transparent and uniform film cannot be obtained. Furthermore, it is necessary that the total weight of the components (a) and (c) is 80 wt % or less of the weight of the entire coating liquid. When the content is more than 80 wt %, the content of the solvent in the coating liquid is reduced accordingly, which makes it difficult to completely dissolve the magnesium carboxylate. When such a coating liquid is used for coating and film-formation, a transparent and uniform film cannot be obtained.

By uniformly mixing the components (a), (b), (c), and (d) and, if necessary, other components, an aqueous coating liquid for forming a magnesium oxide film of the present invention can be obtained. This coating liquid is applied onto a substrate on which a magnesium oxide film is to be formed. As the substrate, a substrate commonly used in the art, for example, a glass substrate, a substrate made of a resin such as polycarbonate, an epoxy resin or the like, a film made of any of these resins, or the like can be used. As described later, when a metal oxide film is produced by baking at a high temperature, for example, at 200° C. or more, glass substrate is preferable. When a metal oxide film is produced by irradiation with ultraviolet light, resin-substrates or resin films are preferable.

There is no limitation regarding the method of applying the coating liquid onto a substrate. For example, brush coating, dipping, spin-coating, spraying, screen printing, roll coating, or pattern formation by the inkjet method can be used. A film obtained by any of these coating methods is dried, and then by a method commonly used in the art, a magnesium oxide film can be obtained. For example, a method of baking at a temperature of 200° C. or more, or a method of irradiating a coating film on a substrate with ultraviolet light to convert it into a metal oxide film, can be employed. Furthermore, these methods can be employed in combination.

When baking is performed, in order to decompose organic components completely, it is preferable to perform baking at a temperature of 200° C. or more, more preferably at 350° C. or more, and even more preferably 450° C. or more.

When the coating liquid of the present invention is used, a substrate can be coated easily and uniformly, and a transparent and uniform magnesium oxide film can be formed.

The present invention provides a coating liquid that can be applied uniformly on a substrate and can form a transparent and uniform magnesium oxide film having a thickness sufficient for practical use. Since the coating liquid is based on a solvent containing water as the main component, the coating liquid does not pollute the environment and is safe for the human body. The aqueous coating liquid for forming a magnesium oxide film of the present invention can be used in a wide range of applications such as producing dielectric protective films in plasma display panels (PDPs), insulating films, catalyst films, or surface protective films.

EXAMPLES

Hereinafter, a method for forming a magnesium oxide film using the aqueous coating liquid of the present invention will be described specifically by way of examples. In the example, "parts" refers to parts by weight.

Method for Evaluating a Coating Liquid, a Coating Film and a Baked Film (I) Evaluation of Appearance of Coating Liquid The appearance of the coating liquid is visually evaluated. In tables below, the evaluation results are shown according to the following criteria.
○ Transparent
X Opaqueness or the presence of a solid is observed.

(II) Evaluation of Coating Performance

The coating liquid is applied onto the surface of a substrate by a spin-coater, and the state after the coating is visually observed. In the tables below, the evaluation results are shown according to the following criteria.
○ Uniformly applied.
X Repelled on the substrate and not applied uniformly.

(III) Evaluation of the State of Film After Pre-baking

The state of the film after pre-baking is visually evaluated. In the tables below, the evaluation results are shown according to the following criteria.
○ Uniform and transparent.
X Opaque, or a crack is present.

(IV) Evaluation of the State of Film After Baking

The state of the magnesium oxide film after baking is visually evaluated. In the tables below, the evaluation results are shown according to the following criteria.
○ Uniform and transparent, and no cracks.
X Opaque, or a crack is present.

(V) Thickness of the Magnesium Oxide Film Obtained by Baking

The thickness is measured using a stylus surface profilometer DEKTAC 3ST manufactured by ULVAC, Inc.

Example 1

Components (a magnesium carboxylate, a surfactant, a polyhydric alcohol compound and water) shown in Table 1 were mixed in amounts shown in Table 1 at room temperature to prepare a coating liquid. This coating liquid was applied onto a glass substrate using a spin-coater. The substrate was pre-baked for 15 minutes on a hot plate that had been previously heated to 80° C. Then, the glass substrate was placed in a baking furnace and heated to 450° C. at a temperature increase rate of 5° C./min in an air atmosphere, and thus a substrate having a magnesium oxide film on its surface was obtained.

In the process, the appearance of the coating liquid, the coating performance (appearance of the coating film), the state of the film after the pre-baking, and the state of the film after the baking at 450° C. were evaluated according to the evaluation methods as described above, and the thickness of the magnesium oxide film after the baking was measured by the above-described method. Table 2 shows the results.

Examples 2 to 20

Coating liquids were prepared using the components shown in Table 1 in the same manner as in Example 1, and substrates having magnesium oxide films were prepared using the coating liquids and evaluation was performed. Table 2 shows the results.

Comparative Examples 1 to 15

Coating liquids were prepared using components shown in Table 3 in the same manner as in Example 1, and substrates having magnesium oxide films were prepared using the coating liquids and evaluation was performed. Table 4 shows the results.

TABLE 1

| | Magnesium carboxylate (a) | | Surfactant (b) | | Polyhydric alcohol compound (c) | | | | Water |
|---|---|---|---|---|---|---|---|---|---|
| | Compound | Amounts (parts) | Surfactant | Compound | Amounts (parts) | Compound | Amounts (parts) | Molecular weight | Temperature (° C.)*1 | Amounts (parts) |
| Example 1 | Mg acetate | 5 | Nonionic I | 0.05 | Glycerin | 0.5 | 92.1 | 256.2 | 94.4 |
| Example 2 | Mg acetate | 20 | Nonionic I | 0.1 | Glycerin | 2.0 | 92.1 | 256.2 | 77.9 |
| Example 3 | Mg acetate | 40 | Nonionic I | 1.0 | Glycerin | 8.0 | 92.1 | 256.2 | 51.0 |
| Example 4 | Mg acetate | 50 | Nonionic I | 1.0 | Glycerin | 10.0 | 92.1 | 256.2 | 29.0 |
| Example 5 | Mg acetate | 30 | Nonionic II | 1.0 | Diethylene glycol | 15.0 | 106.1 | 212.9 | 54.0 |
| Example 6 | Mg acetate | 30 | Nonionic II | 2.0 | Polyethylene glycol (Mw 400) | 3.0 | 400 | 277.6 | 65.0 |
| Example 7 | Mg acetate | 30 | Nonionic III | 1.0 | Polyethylene glycol (Mw 1000) | 3.0 | 1000 | 297.3 | 66.0 |

TABLE 1-continued

| | Magnesium carboxylate (a) | | Surfactant (b) | | Polyhydric alcohol compound (c) | | | | Water |
|---|---|---|---|---|---|---|---|---|---|
| | Compound | Amounts (parts) | Surfactant | Compound | Amounts (parts) | Compound | Amounts (parts) | Molecular weight | Temperature (°C.)*1 | Amounts (parts) |
| Example 8 | Mg acetate | 40 | Nonionic | III | 0.5 | Sorbitan | 6.0 | 164.2 | 348.1 | 63.5 |
| Example 9 | Mg acetate | 40 | Nonionic | IV | 1.0 | Sorbitol | 0.9 | 182.2 | 369.0 | 60.0 |
| Example 10 | Mg acetate | 30 | Nonionic | IV | 1.0 | Trimethylolpropane | 1.0 | 134.2 | 243.6 | 68.0 |
| Example 11 | Mg propionate | 30 | Nonionic | V | 1.0 | Glycerin | 3.0 | 92.1 | 256.2 | 66.0 |
| Example 12 | Mg glycolate | 30 | Nonionic | V | 0.5 | Glycerin | 6.0 | 92.1 | 256.2 | 63.5 |
| Example 13 | Mg lactate | 5 | Nonionic | I | 0.3 | Glycerin | 0.5 | 92.1 | 256.2 | 94.2 |
| Example 14 | Mg butylate | 30 | Nonionic | I | 1.5 | Sorbitan | 5.0 | 164.2 | 348.1 | 63.5 |
| Example 15 | Mg isobutylate | 35 | Nonionic | I | 1.0 | Sorbitan | 10.0 | 164.2 | 348.1 | 54.0 |
| Example 16 | Mg 2-ethyl butylate | 30 | Nonionic | I | 2.0 | Diethylene glycol | 1.0 | 106.1 | 212.9 | 67.0 |
| Example 17 | Mg formate | 5 | Nonionic | I | 0.2 | Diethylene glycol | 0.5 | 106.1 | 212.9 | 94.3 |
| Example 18 | Mg acetate | 30 | Anionic | VI | 0.1 | Glycerin | 3.0 | 92.1 | 256.2 | 66.9 |
| Example 19 | Mg acetate | 30 | Anionic | VII | 0.1 | Sorbitan | 5.0 | 164.2 | 348.1 | 64.9 |
| Example 20 | Mg acetate | 40 | Cationic | VIII | 0.1 | Glycerin | 4.0 | 92.1 | 256.2 | 55.9 |

*1 Weight reduction end temperature in thermal gravimetry
Compound I: Polyoxyethylene (30 moles) lauryl ether,
Compound II: Polyoxyethylene (40 moles) nonylphenyl ether,
Compound III: Polyoxyethylene (15 moles) stearate,
Compound IV: Polyoxyethylene (20 moles) sorbitan monooleate,
Compound V: Polyoxyethylene (20 moles) stearylamine,
Compound VI: Polyoxyethylene (10 moles) lauryl ether sulfate triethanolamine salt,
Compound VII: Dioctylsulfosuccinate ammonium salt,
Compound VIII: Lauryl trimetyl ammonium acetate

TABLE 2

| | Appearance of coating liquid | Coating performance | State of film after pre-baking | State of film after baking | Film thickness (μm) |
|---|---|---|---|---|---|
| Example 1 | ○ | ○ | ○ | ○ | 0.11 |
| Example 2 | ○ | ○ | ○ | ○ | 0.33 |
| Example 3 | ○ | ○ | ○ | ○ | 0.50 |
| Example 4 | ○ | ○ | ○ | ○ | 0.56 |
| Example 5 | ○ | ○ | ○ | ○ | 0.37 |
| Example 6 | ○ | ○ | ○ | ○ | 0.28 |
| Example 7 | ○ | ○ | ○ | ○ | 0.30 |
| Example 8 | ○ | ○ | ○ | ○ | 0.52 |
| Example 9 | ○ | ○ | ○ | ○ | 0.53 |
| Example 10 | ○ | ○ | ○ | ○ | 0.28 |
| Example 11 | ○ | ○ | ○ | ○ | 0.22 |
| Example 12 | ○ | ○ | ○ | ○ | 0.23 |
| Example 13 | ○ | ○ | ○ | ○ | 0.12 |
| Example 14 | ○ | ○ | ○ | ○ | 0.28 |
| Example 15 | ○ | ○ | ○ | ○ | 0.18 |
| Example 16 | ○ | ○ | ○ | ○ | 0.19 |
| Example 17 | ○ | ○ | ○ | ○ | 0.11 |
| Example 18 | ○ | ○ | ○ | ○ | 0.20 |
| Example 19 | ○ | ○ | ○ | ○ | 0.21 |
| Example 20 | ○ | ○ | ○ | ○ | 0.17 |

TABLE 3

| | Magnesium carboxylate (a) | | Surfactant (b) | | Polyhydric alcohol compound (c) | | | | Water |
|---|---|---|---|---|---|---|---|---|---|
| | Compound | Amounts (parts) | Surfactant | Compound | Amounts (parts) | Compound | Amounts (parts) | Molecular weight | Temperature (°C.)*1 | Amounts (parts) |
| Com. Ex. 1 | Mg acetate | 10.0 | Nonionic | I | 1.0 | Glycerin | 15.0 | 92.1 | 256.2 | 74.0 |
| Com. Ex. 2 | Mg isobutylate | 20.0 | Nonionic | I | 0.5 | Diethylene glycol | 30.0 | 106.1 | 212.9 | 49.5 |
| Com. Ex. 3 | Mg acetate | 60.0 | Nonionic | I | 0.1 | Glycerin | 6.0 | 92.1 | 256.2 | 33.9 |
| Com. Ex. 4 | Mg propionate | 55.0 | Nonionic | I | 0.1 | Sorbitan | 1.0 | 164.2 | 348.1 | 43.9 |
| Com. Ex. 5 | Mg acetate | 30.0 | Nonionic | I | 0.001 | Glycerin | 3.0 | 92.1 | 256.2 | 66.999 |
| Com. Ex. 6 | Mg glycolate | 25.0 | Nonionic | I | 0.003 | Trimethylolpropane | 5.0 | 134.2 | 243.6 | 69.997 |
| Com. Ex. 7 | Mg acetate | 30.0 | Nonionic | II | 5.0 | Glycerin | 3.0 | 92.1 | 256.2 | 62.0 |
| Com. Ex. 8 | Mg formate | 5.0 | Nonionic | II | 4.0 | Sorbitol | 4.0 | 182.2 | 369.0 | 87.0 |
| Com. Ex. 9 | Mg acetate | 20.0 | Nonionic | III | 1.0 | Glycerin | 0.01 | 92.1 | 256.2 | 78.99 |
| Com. Ex. 10 | Mg lactate | 5.0 | Nonionic | III | 0.5 | Polyethylene glycol (Mw 400) | 0.01 | 400 | 277.6 | 94.49 |
| Com. Ex. 11 | Mg acetate | 45.0 | Nonionic | IV | 0.1 | Glycerin | 45.0 | 92.1 | 256.2 | 9.9 |
| Com. Ex. 12 | Mg acetate | 30.0 | Nonionic | IV | 0.003 | Polyethylene glycol (Mw 4000) | 6.0 | 4000 | 499.7 | 63.0 |
| Com. Ex. 13 | Mg acetate | 30.0 | Nonionic | V | 0.1 | Polyethylene glycol (Mw 11000) | 0.01 | 11000 | 510.7 | 69.89 |

TABLE 3-continued

| | Magnesium carboxylate (a) | | Surfactant (b) | | | Polyhydric alcohol compound (c) | | | | Water |
|---|---|---|---|---|---|---|---|---|---|---|
| | Compound | Amounts (parts) | Surfactant | Compound | Amounts (parts) | Compound | Amounts (parts) | Molecular weight | Temperature (° C.)*1 | Amounts (parts) |
| Com. Ex. 14 | Mg acetate | 40.0 | Nonionic | I | 1.5 | —*2 | 4.0 | 76.1 | 154.3 | 54.5 |
| Com. Ex. 15 | Mg octylate | 3.0 | Nonionic | I | 1.0 | Glycerin | 1.0 | 92.1 | 256.2 | 95.0 |

Compound I: Polyoxyethylene (30 moles) lauryl ether,
Compound II: Polyoxyethylene (40 moles) nonylpheny ether,
Compound III: Polyoxyethylene (15 moles) stearate,
Compound IV: Polyoxyethylene (20 moles) sorbitan monooleate,
Compound V: Polyoxyethylene (20 moles) stearylamine
*1Weight reduction end temperature in thermal gravimetry
*2Diethylene glycol monomethyl ether

TABLE 4

| | Appearance of coating liquid | Coating performance | State of film after pre-baking | State of film after baking | Film thickness (μm) |
|---|---|---|---|---|---|
| Com. Ex. 1 | ○ | ○ | X | X | 0.17 |
| Com. Ex. 2 | ○ | ○ | X | X | 0.16 |
| Com. Ex. 3 | X | X | X | X | — |
| Com. Ex. 4 | X | X | X | X | — |
| Com. Ex. 5 | ○ | X | X | X | — |
| Com. Ex. 6 | ○ | X | X | X | — |
| Com. Ex. 7 | ○ | ○ | X | X | 0.29 |
| Com. Ex. 8 | ○ | ○ | X | X | 0.10 |
| Com. Ex. 9 | ○ | ○ | X | X | — |
| Com. Ex. 10 | ○ | ○ | X | X | — |
| Com. Ex. 11 | X | X | X | X | — |
| Com. Ex. 12 | ○ | X | X | X | — |
| Com. Ex. 13 | ○ | ○ | X | X | 0.24 |
| Com. Ex. 14 | ○ | ○ | X | X | — |
| Com. Ex. 15 | X | X | X | X | — |

The following is evident from Tables 1 and 2. Each of the coating liquids of Examples 1 to 20 contains the magnesium carboxylate (a) derived from a carboxylic acid having 1 to 6 carbon atoms, the surfactant (b), and the polyhydric alcohol compound (c). The contents of these components are as follows: the content of the component (a) is 5 wt % or more and 50 wt % or less; the content of the component (b) is 0.01 wt % or more and 2.5 wt % or less; the content of the component (c) is 0.05 wt % or more and 40 wt % or less; and the content of the component (a) is larger than that of the component (c). Furthermore, the sum of the contents of the components (a) and (c) is 80 wt % or less of the weight of the entire coating liquid.

These coating liquids are transparent and uniform, and when substrates are coated with these coating liquids, the coating films are uniform and transparent in the process of pre-baking and after the baking at 450° C., and thus magnesium oxide films without cracks can be produced.

On the other hand, the following is evident from Tables 3 and 4. Each of the coating liquids of Comparative Examples 1 and 2 contains the component (c) in an amount that is more than the amount of the component (a), and each of the coating liquids of Comparative Examples 7 and 8 contains the component (b) in a ratio of more than 2.5 wt %. When these coating liquids are employed, the formed magnesium oxide films become opaque.

Each of the coating liquids of Comparative Examples 3 and 4 contains the component (a) in a ratio of more than 50 wt %. In Comparative Example 11, the total amount of the components (a) and (c) is more than 80 wt %. In Comparative Example 15, the component (a) is not a magnesium salt of a carboxylic acid having 1 to 6 carbon atoms. In these coating liquids, the magnesium carboxylate is not completely dissolved in the solvent, and is present in the form of a solid, so that the coating liquid is opaque. Table 4 indicates that when such a coating liquid is used for coating and film-formation, a uniform and transparent film cannot be obtained.

Each of the coating liquids of Comparative Examples 5 and 6 contains the component (b) in a ratio of less than 0.01 wt %. In Comparative Example 12, the component (b) is less than 0.01 wt %, and the molecular weight of the component (c) exceeds 1000. These coating liquids were repelled on the substrates and could not be applied uniformly.

Each of the coating liquids of Comparative Examples 9 and 10 contains the component (c) in a ratio of less than 0.05 wt %. In Comparative Example 13, the amount of the component (c) is less than 0.05 wt %, and the molecular weight of the component (c) exceeds 1000. In Comparative Example 14, the component (c) is not a polyhydric alcohol. In these coating liquids, the magnesium carboxylate is crystallized on the substrate, which causes opaqueness.

Thus, in either comparative example, a transparent and uniform magnesium oxide film could not be obtained by baking.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An aqueous coating liquid for forming a magnesium oxide film comprising:
   (a) a magnesium carboxylate derived from a carboxylic acid having 1 to 6 carbon atoms;
   (b) a surfactant;
   (c) a polyhydric alcohol compound; and
   (d) a solvent made substantially of water;
   wherein the magnesium carboxylate is contained in a ratio of 5 wt % or more and 50 wt % or less; the surfactant is contained in a ratio of 0.01 wt % or more and 2.5 wt % or less; and the polyhydric alcohol compound is contained in a ratio of 0.05 wt % or more and 40 wt % or less, based on a weight of the entire coating liquid, a content of the magnesium carboxylate is the same with or larger than that of the polyhydric alcohol compound, and a total weight of the magnesium carboxylate and the polyhydric alcohol compound is 80 wt % or less of the weight of the entire coating liquid, and the magnesium carboxylate, the surfactant, and the polyhydric alcohol compound are dissolved in the solvent.

2. The aqueous coating liquid for forming a magnesium oxide film of claim 1, wherein the polyhydric alcohol compound has a molecular weight of 1000 or less.

3. The aqueous coating liquid for forming a magnesium oxide film of claim 1, wherein the surfactant is free from a metal element and a halogen element.

* * * * *

UNITED STATES PATENT AND TRADEMARK OFFICE
CERTIFICATE OF CORRECTION

PATENT NO.       : 6,911,072 B2                                                           Page 1 of 1
APPLICATION NO. : 10/803173
DATED            : June 28, 2005
INVENTOR(S)      : Kada et al.

It is certified that error appears in the above-identified patent and that said Letters Patent is hereby corrected as shown below:

On the title page item (56), References Cited, U.S. PATENT DOCUMENTS, add the following reference:

-- 5,191,098  A  03/1993     Koenig et al. --

Signed and Sealed this

Seventh Day of April, 2009

JOHN DOLL
*Acting Director of the United States Patent and Trademark Office*